Sept. 19, 1950 J. C. STEWART 2,522,846

MULTICHANNEL CARRIER TELEPHONE SYSTEM PROVIDING FOR MUSIC TRANSMISSION AT CARRIER FREQUENCIES

Filed April 10, 1946 2 Sheets-Sheet 1

Inventor:
James Charles Stewart
by his Attorneys
Howson & Howson

Sept. 19, 1950 J. C. STEWART 2,522,846

MULTICHANNEL CARRIER TELEPHONE SYSTEM PROVIDING FOR MUSIC TRANSMISSION AT CARRIER FREQUENCIES

Filed April 10, 1946 2 Sheets-Sheet 2

Inventor:
James Charles Stewart
by his Attorneys
Howson & Howson

Patented Sept. 19, 1950

2,522,846

UNITED STATES PATENT OFFICE 2,522,846

MULTICHANNEL CARRIER TELEPHONE SYSTEM PROVIDING FOR MUSIC TRANSMISSION AT CARRIER FREQUENCIES

James Charles Stewart, Neutral Bay, near Sydney, New South Wales, Australia, assignor to Communication Engineering Pty. Limited, Canberra, New South Wales, Australia, a company of Australia Application April 10, 1946, Serial No. 660,865
In Australia August 2, 1943

1 Claim. (Cl. 179—15)

Figure 1:
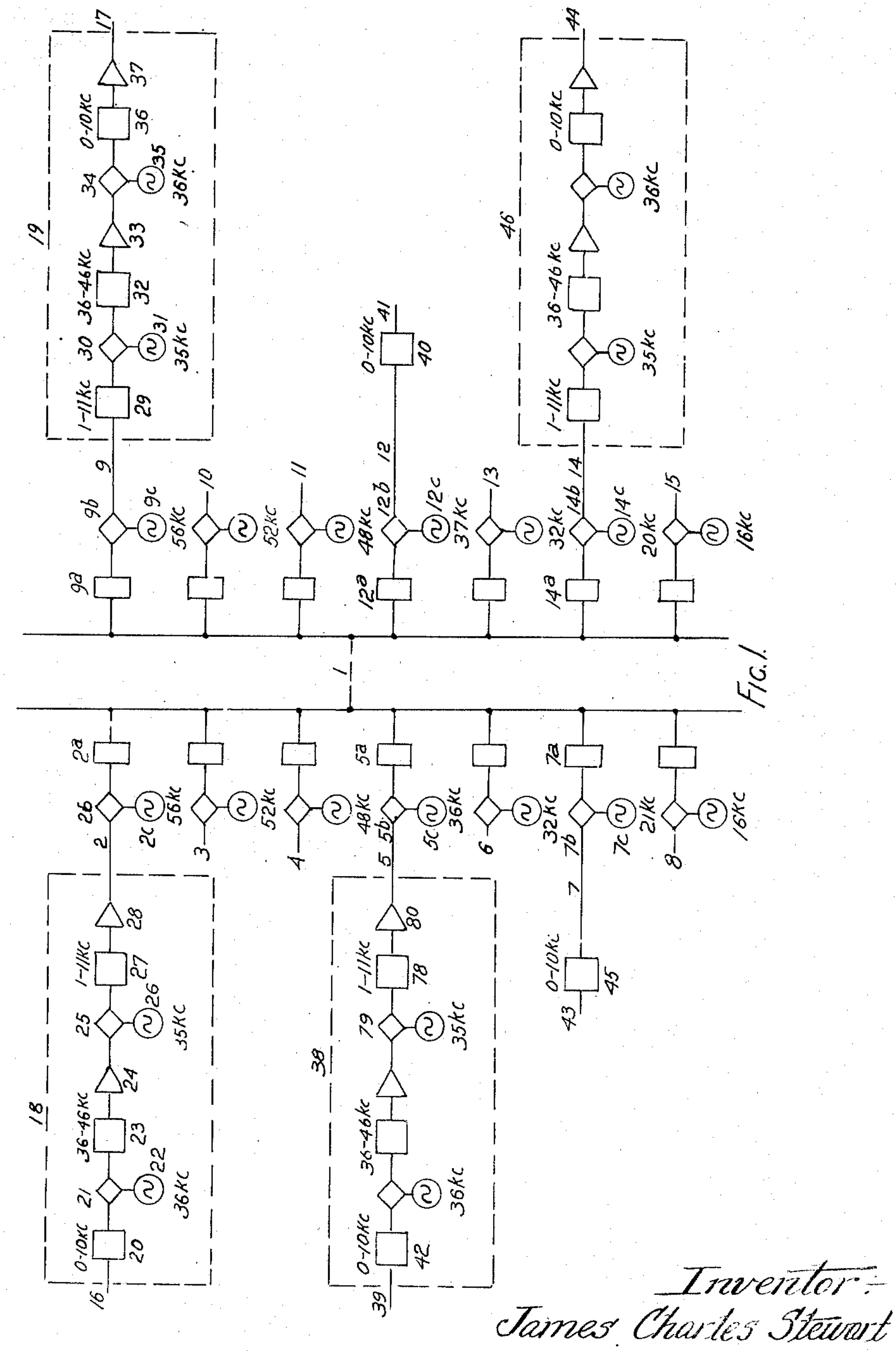

This invention relates to multi-channel telephone systems, and more particularly to such systems as are adapted to transmit over broad band channels in addition to normal telephone or like channels.

Multi-channel telephone systems are usually arranged as to their frequency bands so as to get as many channels as possible within a given spectrum or frequency range. One widely used system uses a spacing between carriers of 4 kC/s, these carriers commencing at 4 kC/s, and extending sometimes to 100 kC/s and more. This arrangement of frequency bands allows the transmission in each telephone channel of voice frequency currents ranging from as close to zero frequency as it is economically desirable to go, to as close to 4 kC/s as it is economically desirable to go. The usual known present practice for telephone channels with 4 kC/s spacing is to transmit from about 200 c/s up to about 3500 c/s.

For the transmission of music or high quality speech currents, usual known practice requires the provision of a channel capable of transmitting currents ranging in frequency down to 30 c/s; and it is generally necessary or desirable to replace one or a number of these old telephone channels to achieve such purpose. A "broad band" channel as referred to herein is one which is capable of transmitting very low frequency currents. The term "broad" is defined herein as a relative measure of channel width made on an octave basis. For example, the change from 200 c/s to 30 c/s is 2.6 octaves whereas the larger frequency change from 3500 c/s to 10,000 c/s is merely 1.5 octaves. The term "channel" is used irrespective of whether the transmission can take place only in one direction at any one time as for music or in both directions as for a two-way conversation.

In my co-pending application, Serial No. 547,747 a multi-channel telephone system is disclosed wherein a broad band of frequencies is transmitted by generating a wanted sideband, suppressing the carrier, suppressing the unwanted second sideband, and altering the position of the wanted sideband away from the position which the sideband of the replaced telephone channel (or channels) of normal band width would have occupied. For example, in the multi-channel telephone system first mentioned, normal telephone channels use the upper sidebands of 56 kC/s, 60 kC/s, and 64 kC/s; and application 547,747 referred to above, shows how a broad band of frequencies can be transmitted, for example in the frequency region between 57 kC and approximately 67 kC. The specification 547,747 also sets out the several advantages of this change in frequency, namely, easier suppression of the vestige of the unwanted sideband, lower value of low frequency limit of transmission, reduced crosstalk to and from neighbouring ordinary telephone channels, and finally greater stability of equalization. All of these factors can be summed up in the general statement, that the use of the frequency range 57 kC to 67 kC in place of the range 56 kC to 66 kC previously regarded as normal improves the quality of transmission. As explained in the above mentioned specification, the exact value of this frequency shift is not of importance and satisfactory results could be obtained with shifts as low as 500 cycles, or with even smaller shifts in some cases. It was also explained that while shifts greater than 1 kC might be useful, these are seldom if ever really necessary.

The present invention is applicable where one or a number of normal carrier telephone channels are replaced by one single broadband channel and/or where the sideband transmitted when said broadband channel is working is moved away from its normal position in a direction towards the sideband frequency normally occupied by a high channel frequency of said broadband. The latter condition is most clearly expressed by reference to the displacement of the virtual carrier frequency, which displacement is from the sideband frequencies corresponding to lower voice frequencies of music or telephone transmission towards the sideband frequencies corresponding to higher voice frequencies of music or telephone transmission.

The term "virtual carrier frequency" used in the preceding paragraph is defined as follows: In a suppressed carrier system transmitting a single sideband to the line or other common transmission path, this sideband is evident by the appearance on the line from time to time of energy at various frequencies. Sideband frequencies are liable to vary, of course, depending upon the way the signal being transmitted is varying;

and to this extent a statement of the properties and qualities of a transmission channel in terms of the sideband frequencies alone is sometimes very difficult to make clear and definite. A way which is frequently much better is to make use of the frequency of which the transmitted energy would constitute the sideband waves were waves of this frequency actually present. This latter frequency may be referred to as the carrier frequency to line or as the virtual carrier frequency. The word "virtual" is particularly useful in this regard as a reminder (*a*) that waves having the virtual carrier frequency are ordinarily not present on the line since the carrier is suppressed in systems of the kind considered, and (*b*) that the virtual carrier frequency is quite often distinct from any of the carrier supply frequencies involved. When multiple stage modulation is employed the virtual carrier frequency is in general distinct; but when single stage modulation is employed to produce the particular sideband in question, then the virtual carrier frequency must necessarily equal the carrier supply frequency.

A principal object of the invention is the provision of means whereby music or high quality speech currents covering a broadband in the frequency spectrum may be transmitted and truly reproduced at a distant point. Another object is to facilitate the attainment of a high degree of freedom from crosstalk to and from a broadband channel in a multi-channel system having also channels of normal bandwidth. A further object of the invention is to permit a considerable reduction of filters and other equipment required hitherto, and also to further improve and facilitate the maintaining of constancy and stability of transmission characteristics of such a system. Other uses to which the broadband transmission channel of this invention may be applied will be apparent from the following description.

A feature of the application of the method of the invention in a multi-channel telephone system, lies in changing the carrier supply frequency of a channel away from its normal value at one end of the system, while retaining the normal value at the other end. According to another feature of the invention, any vestige of unwanted sideband is suppressed by means located at that terminal where the carrier frequency is kept normal. Again, according to still a further feature, the frequency range of the broad band is shifted by an amount which (at the receiving point for the broad band) annuls the frequency shift imposed by the step of changing the carrier frequency; and this annulling shift is brought about by means which according to the invention is also located at the terminal where the carrier frequency is kept normal. By the use of the above step of shifting the carrier frequency at one end of the system away from the value normal to the channel in question, the additional apparatus required at this same end of the system for good quality transmission and true reproduction, is reduced to a single filter; whereas in the system described in application 547,747 the more extensive arrangement of additional modulators and filters is required at both ends.

One way of carrying out the invention, is to locate the frequency shifting means at, for example, the sending terminal of the system; and therefore (according to the invention) to alter the carrier supply frequency at the receiving terminal. In this case, the shifting of the frequency range of the broad band is done prior to feeding the broad band into the channel. Furthermore, "shifting" in this case constitutes raising the position of the broad band in the frequency spectrum; this raising in frequency prior to being fed into the channel applies equally, whether the channel itself transmits upper side band or lower side band; this latter circumstance being merely a matter of the type of system which may happen to be available in the first place and to which the invention is to be applied. At the receiving terminal, the carrier supply frequency of the channel being used is shifted away from the normal value which is retained unaltered at the transmitting terminal. In the case of systems transmitting upper side band the change or shift in carrier supply frequency according to the invention is brought about by increasing the carrier supply frequency by the same amount as the frequency shifting means located at the transmitting terminal raises the frequency of the broad band. In the case of systems transmitting lower side band the change or alteration of the carrier supply frequency according to the invention consists in lowering the carrier frequency by this same amount.

It makes no technical difference whatsoever which terminal is selected as the site or location of the frequency shifting means; and it is a feature of the invention that this selection can be made on such non-technical and purely administrative considerations as available space, general convenience or the like.

Consequently, another equally valuable way of carrying the invention into effect is to locate the frequency shifting means at the receiving terminal of the system. The alteration of the carrier supply frequency must then according to the invention be carried out on the sending terminal. The same considerations as stated above apply to the relation between the magnitude of the alteration in the carrier supply frequency and the magnitude of shift in frequency of the broad band at the receiving terminal. This shift in frequency of the broad band by means located at the receiving terminal must consist of a lowering of frequency; and this, whether the system transmits upper side band or lower side band.

Sometimes it will be required to provide wide band channels in both directions of transmission of the multi-channel system; and it will be possible according to the invention to locate all of the necessary frequency-shifting equipment at one or the other terminal according to convenience; or to put the equipment for some of the channels at one terminal and some at the other terminal according to the relative space available.

It will sometimes be required to provide wide band channels in only one direction at any one time. For example many channels for music transmission have hitherto been provided with apparatus which is altered to serve first one direction of transmission and then the other.

According to a feature of the invention, a one-way wide band transmission path of the type provided in a multi-channel telephone system according to the invention, is made "one-way reversible" by the provision of switching means partly located at one end of the channel and partly at the other end. At that terminal at which the carrier supply frequency is changed away from the value normal to the multi-channel telephone system channel, the switching means changes over the single filter from the input of a multi-channel telephone system sending channel to the output of a system receiving channel. At the other terminal, the switching means changes the frequency-shifting means from the output of a receiving channel to the input of a sending channel; but at the same time, changes over the direction of transmission through the frequency-shifting means—this latter process being merely the re-connecting of the amplifiers in different places; and it should be noted that this re-locating of the amplifiers in new positions automatically effects a change-over of the frequency shifting means from lowering of frequency to raising of frequency.

In order to make it quite clear that changing over the directions and position of the amplifier in the frequency shifting means will enable it to work in the other direction of transmission (i. e., will enable it to work equally well in a direction in which it raises frequencies as in a direction in which it lowers frequencies), it is merely necessary to consider the well known facts: (*a*) that filters are capable of transmitting equally well in two directions and (*b*) that the same applies to modulators as they are now usually manufactured. It is now the usual practice to provide modulators employing, for example, copper oxide rectifier networks connected tandemwise between the terminals of a high frequency side and the terminals of a low frequency side, with the carrier being supplied through a third set of terminals. The loss from the high frequency side to the low frequency side is the same as the loss from the low frequency side to the high frequency side; or in other words, usual modulators are perfectly reversible in direction. Consequently, if the incidental amplifiers in the chain of equipment constituting a frequency changing means are reincorporated into the chain at new positions and pointing in the other direction of transmission, the frequency shifting means will work in the new direction.

Figure 2:
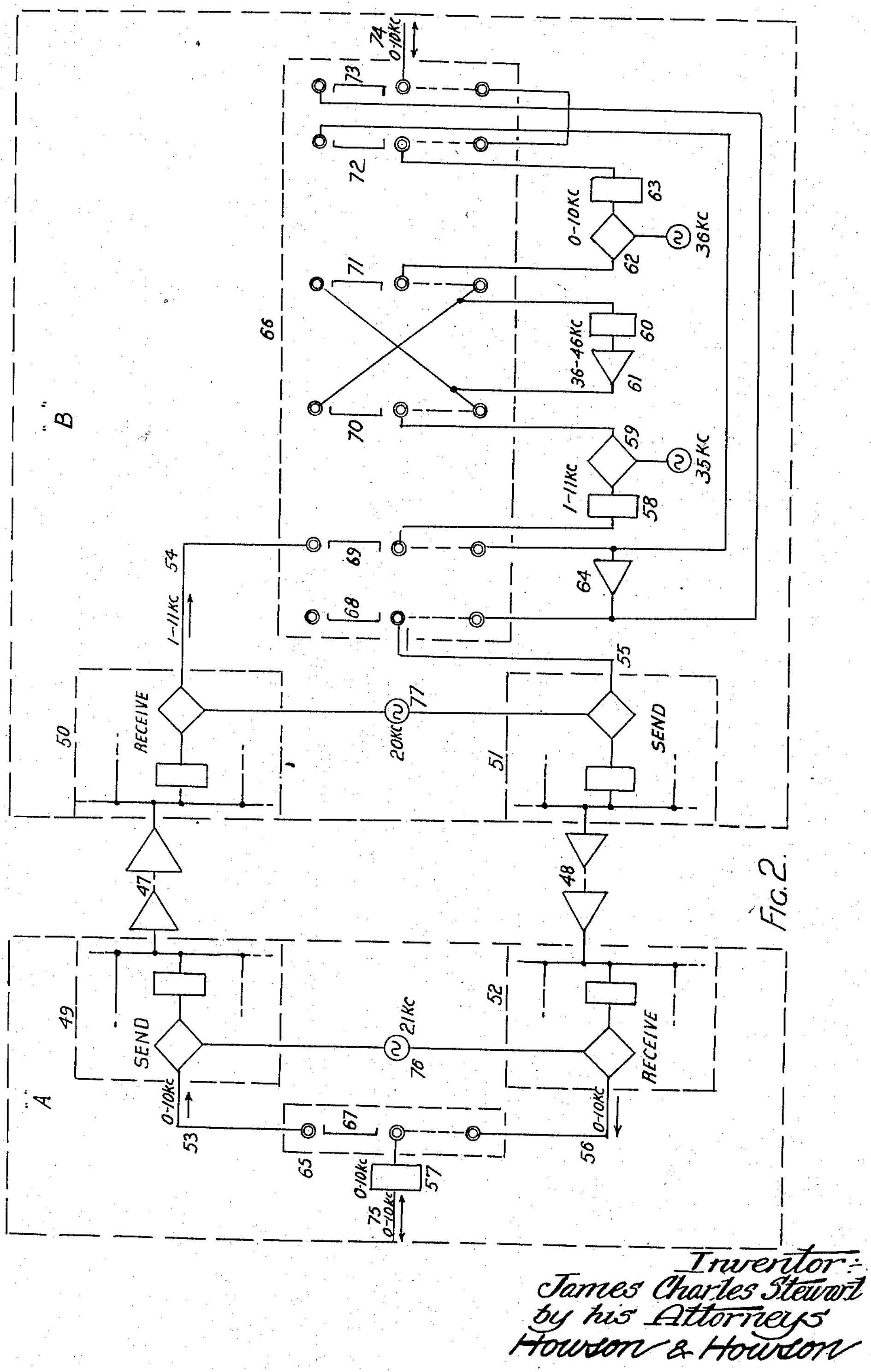

Other features of the inventon will be evident from the description of embodiments thereof with reference to the annexed drawings, wherein Fig. 1 depicts a part of a multi-channel telephone system which is adapted for "one-way" broad band transmission in three of its channels; and Fig. 2 depicts a single "one-way reversible" broad band channel working over a two-way multi-channel telephone system.

The telephone line 1 includes such amplifiers, equalizers and other gear which may be needed to provide the requisite transmission for a group of sending circuits including circuits 3, 4, 6, and 8, and a group of receiving circuits including circuits 10, 11, 13, and 15. These latter sending and receiving circuits represent normal telephone channel equipment and the channels derived thereby may be extended directly into the normal trunk exchange.

The filter **2*a* replaces the normal filters of one, two or even three such channels, dependent on the highest frequency required to be transmitted; and in the example chosen passes a frequency band extending from a little above 56 kC to a little below 68 kC. Modulator 2*b*, associated with filter 2*a*, is fed from oscillator 2*c* having a frequency of 56 kC as shown on the diagram, and these make up the sending circuits of a channel. At the receiving end, filter 9*a*, de-modulator 9*b*, and oscillator 9*c* together constitute a similar receiving channel terminal circuit passing the same band. In this way a channel 2—9 from the input of modulator 2*b* to the output of modulator 9*b* will transmit a frequency band suitable at least insofar as high frequencies are concerned for the transmission of music or high frequency speech currents. As regards low frequency music currents extending down as low as, for example 30 c/s, extensive equalisation will be necessary. As explained in the co-pending application 547,747 above mentioned, this method of providing a broad band channel having various disadvantages, namely: excessive crosstalk to and from the broad band channel from and to neighbouring channels of normal band width unless filters are re-designed; difficulty of separating wanted and unwanted sideband; extreme instability of loss frequency characteristic particularly at the low frequency end; and the like. It is also explained in the above mentioned specification, how these disadvantages and difficulties can be avoided in providing a transmission channel 16—17 for a broad band of frequencies, by interposing the sets of equipment 18 and 19. The equipment 18 is connected between the broad band sending point 16 and the sending circuit 2 of the multi-channel telephone system proper, and comprises low pass filter 20, modulator 21 which is supplied with carrier frequency by oscillator 22 and whose output is connected to band pass filter 23 and thence (through amplifier 24) to modulator 25. Modulator 25 is supplied with carrier frequency by oscillator 26 and its output passes through band pass filter 27 and amplifier 28 whence the output is taken via line 2 into the multi-channel telephone system proper. On the receiving side of the multi-channel telephone system, the block of equipment 19 is connected between output 9 of the multi-channel system proper, and the broad band receiving point 17. The line 9 is connected to band pass filter 29, whose output is taken to modulator 30 which is supplied with carrier by the oscillator 31. The output of modulator 30 is taken to band pass filter 32, thence through amplifier 33, and thence to modulator 34 which is supplied with carrier by oscillator 35. The output from modulator 34 passes through low pass filter 36, then through amplifier 37, whence the output is taken by line 17** to the receiving point of the broad band channel.

All of these arrangements for extending the multi-channel telephone system with additional equipment for broad band transmission so far described in connection with Figure 1, are those described and claimed in my above mentioned co-pending application Serial No. 547,747. Briefly summarized, they comprise in order along a transmission path in the frowards direction:

(*a*) The process of raising the frequency of the broad band received over input line 16 (by 1 kC in this example), this frequency raising being carried out by the block of equipment 18.

This process of raising the frequency band includes the subsidiary process, of attenuating the vestige of unwanted sideband generated in modulator 21, and incompletely suppressed by filter 23. This suppression is done by the filter 27, the vestige of unwanted sideband at this point of the transmission path being the lower sideband of 1 kC, and being suppressed by the attenuating band extending from 970 c/s towards zero frequency.

(*b*) The broad band, after its frequency is raised, is transmitted as the frequency band 1–11 kC over the normal path in the carrier system proper, extending from the input 2 on the send side to the output 9 on the receive side, where it reappears as the band 1 to 11 kC, exactly the same band as goes into the multi-channel system input circuit 2. (This is quite normal in a multi-channel telephone system, where a band of frequencies goes into the send modulator and emerges from the receive demodulator as exactly the same band of frequency.)

(c) After emerging from the output 9 of the multi-channel telephone system, the broad band which occupies the range 1 to 11 kC, is filtered to further suppress the unwanted sideband and is then lowered in frequency so that it occupies the range 0 to 10 kC, this process being carried out by the block of equipment 19.

It will be appreciated that the frequency changing means 18 (taken from the co-pending application 547,747), uses identical equipment to that used in the frequency changing means 19 (also taken from 547,747) with the exception of amplifier 28 and amplifier 37. According to present practice these amplifiers are always made interchangeable so that although in service amplifier 28 passes only 1 to 11 kC, it is always made capable of working to the same low frequency as amplifier 37 which in most cases would be 30 c/s. Again, although in actual service amplifier 37 passes only frequencies as high as 10 kC, nevertheless the amplifier is always made to pass frequencies up to 11 kC in order that it may be put into service in place of an amplifier 28 and vice versa should this be required on the occasion of fault.

The block of equipment 18 can be changed into the block of equipment 19 by: (a) connecting the amplifier 24 in the other direction of transmission between filter 23 and modulator 21 instead of its present position between filter 23 and modulator 25; and (b) connecting the amplifier 28 in the other direction of transmission in the position filter 20 and line 16. This makes a change to a block of equipment identical with the equipment 19. Filter 27 is of the same type as, and is interchangeable with filter 29; and modulator 30 is of the same type as, and is interchangeable with modulator 25. The oscillator 26 is of exactly the same frequency as oscillator 31; and both modulators 25 and 30, which these oscillators supply, have the same frequency ranges on both the high frequency and the low frequency sides. Consequently the losses through these modulators are normally identical at every frequency. Similarly, modulator 21 and modulator 34 operate on the same carrier frequency, and in the low frequency direction they face filters 20 and 36 respectively, which are of the same type and pass the same frequency range. In the high frequency direction these two modulators 21 and 34 face respectively the filters 23 and 32 which pass the same frequency range and are of interchangeable type. Consequently, since all these modulators would normally be of copper oxide rectifier type in present day equipment, replacing the position and direction of the two amplifiers 24 and 28 transforms the block of equipment 18 into the block of equipment 19. Vice versa, by turning round and re-positioning amplifiers 33 and 37, the block of equipment 19 is changed into the block of equipment 18.

In accordance with the present invention the full equipment 18 and 19 shown on the send and receive sides respectively of the broad band channel 16–17 is not vital. The same effect can be achieved by changing the frequency of the oscillator of the channel at one terminal of the multi-channel system proper, and at the same time using only one set of frequency shifting means located (according to the invention) at the other terminal. As explained above, it is a matter of mere choice at which end the carrier frequency will be changed; and having made a choice, from then on it follows automatically that the frequency changing means will be located at the other terminal, and that its precise arrangement as regards raising or lowering the frequency will also be thereby pre-determined.

For example, the channel 5—12 in the multi-channel telephone system proper, can be adapted in accordance with the invention for transmitting a broad band of frequencies, by locating at say the send terminal 5, frequency-shifting means and also means for suppressing vestiges of unwanted sideband, these two latter means comprising the equipment shown in the rectangle 38. The equipment 38 is connected between the broad band sending point 39 and the line 5 to the channel proper, and is identical with the equipment previously described in the rectangle 18 except that all the suppression of the vestige of unwanted sideband must be included, whereas this function was equally divided between the two sets of equipment shown in the rectangles 18 and 19. The equipment 38 comprises filter 78 for suppressing vestiges of unwanted sideband (corresponding to filter 27), and it contains the chain of frequency-shifting equipment from filter 42 to modulator 79 (corresponding to the chain from filter 20 to modulator 25), and also the amplifier 80 (corresponding to amplifier 28).

According to the invention, when this choice of location has been made for the frequency shifting means included in the rectangle 38, its interconnection automatically becomes pre-determined; in this example, it raises the frequency. Similarly when the location of the combined frequency-shifting and unwanted sideband suppression means 38 has been chosen (as for example, the transmitting terminal) the particular carrier supply frequency which must be changed, is (according to the invention) that frequency provided by oscillator 12c at the receiving terminal of the multi-channel system. As explained above the amount of the change in the oscillator frequency (that is the magnitude of the difference in frequency between the changed oscillator 12c and the unchanged oscillator 5c at the first chosen terminal) is equal to the amount by which frequencies are shifted by the means 38.

By these arrangements, the equipment at one end of the channel is reduced to a single filter, in this case the low pass filter 40 connected between the output 12 of the multi-channel telephone system proper and the broad band channel receiving point 41. This low pass filter 40 passes the same range (for example 0–10 kC) as the low pass filter 36 in the channel 16—17 and as the low pass filter 20 in the same channel, and also as the low pass filter 42 in the frequency changing means in the path from 39 to 5. In the channel under consideration this filter 40 is connected at the terminal 12 at which the carrier frequency 12c of the multi-channel telephone system is changed away from normal.

In a similar manner, the carrier frequency chosen to be altered may be the carrier of the sending terminal of the channel, in which case as before, the frequency changing means and the unwanted sideband suppressing means must both in accordance with the invention be located at the other terminal namely, the receive terminal. This is shown in the broad band channel 43—44, in which low pass filter 45 is connected between the broad band transmitting point 43 and modulator input circuit 7; in which oscillator 7c has its frequency changed away from the frequency of oscillator 14c at the receiving terminal (this latter oscillator 14c being kept at its normal frequency); and in which combined frequency changing and unwanted sideband suppressing means 46 (identical with 19) is connected between the modulator output 14 and the receiving point 44 of the broad band channel. As before, the amount of the difference in frequency between oscillator 7c and oscillator 14c depends only on the amount by which frequencies are shifted by the means 46, which in this use must of course be so connected up as to lower the frequency of the broad band.

It will be appreciated that equipment 38 on the send side of broad band channel 39—41 is the same as the equipment 46 on the receive side of channel 43—44 with the sole exception of the placing and direction of the two amplifiers.

The telephone line 47 and the telephone line 48 in Fig. 2 are one way circuits complete with amplifiers, equalizers and the like such as are used in a carrier-on-cable system having a "go" cable and a "return" cable each in a separate shield. In one direction the "send" equipment 49 is located for example at "A," and the "receive" equipment 50 is located at "B" as shown in Fig. 2 and these "send" and "receive" equipments operate over telephone line 47 and provide channels in one direction. Similarly "send" equipment 51 is located at "B" and "receive" equipment 52 is located at "A" and these provide similar channels in the other direction working over telephone line 48. The channels provided by these sets of equipment are normally of the sort usually combined in known manner with hybrid transformers to provide two-way telephone circuits. In the direction from "A" to "B" channel 53—54 is provided over the telephone line 47 and in the opposite direction channel 55—56 is provided over the telephone line 48. These two channels 53—54 and 55—56 respectively are used in the manner according to the invention and described earlier, by associating with them low pass filter 57 at "A," where carrier supply frequency 76 is altered away from the unaltered carrier supply frequency 77 normal to the channel in use; and, by associating with them band pass filter 58, modulator 59, band pass filter 60, amplifier 61, modulator 62, low pass filter 63, and finally, amplifier 64—all the equipment 58-64 inclusive being located at "B" as shown in Fig. 2.

An "one-way reversible" broad band transmission channel working over a two-way multi-channel telephone system is provided according to the invention by the association of switching means 65 (at "A") and switching means 66 (at "B") with the equipment previously described and enumerated in Fig. 2. The switching equipment 65 and 66 consists, in the embodiment described in Fig. 2, of a number of U-link sockets arranged on a panel so that U-links can be inserted between the upper row of sockets and the middle row of sockets, or alternatively, between the middle row of sockets and the bottom row of sockets. When the U-links 67, 68, 69, 70, 71, 72 and 73 are inserted between the upper row of sockets and the middle row of sockets at both "A" and at "B" as shown in Fig. 2, then the one-way reversible broad band channel works between "A" and "B." Whenever the U-links are inserted between the middle row of sockets and the bottom row of sockets at both "A" and "B" (the conditions shown by the straight dotted lines joining the sockets in switching means 65 and switching means 66) then the channel transmits between "B" and "A."

The channel when transmitting between "B" and "A" between points 74 at "B" and 75 at "A" and operating over telephone line 48 is exactly of the same form as the channel 39—41 shown in Fig. 1. The layout of the components in Fig. 2 is from right to left, and the layout in Fig. 1 is from left to right; but it is easy to see that the progression from 74 in Fig. 2 and from 39 in Fig. 1 towards the respective terminals at the other end of the respective telephone lines 48 and 1 is through exactly the same sort of equipment in exactly the same order of location. Similarly when the U-links are in their positions as shown between the upper row of sockets and the middle row of sockets, the broad band channel from the line 75 to the line 74 and transmitting via telephone line 47 in Fig. 2, is of exactly the same form as the broad band channel between line 43 and the line 44 in Fig. 1.

By the use of the switching means 65 and the switching means 66, the one set of frequency changing and sideband suppressing equipment located at whichever of the terminals of the multi-channel telephone system happens to be the most convenient terminal to house this equipment, enables the reversible broad band channel to be changed over from one direction of transmission to the other by the simple operation of pulling out all the U-links from their one set of positions and putting them all in at their other set of positions. This can be done with U-links in one quick operation, taking no more than a couple of seconds or so, since it is commonly known to mount several U-links together on the one block of insulating material so that all the U-links can be simultaneously inserted in their new sockets. Thus it is merely necessary to take the U-links from between the top and middle rows of sockets and insert them between the middle and bottom rows of sockets (or in other words to operate the switching means associated with each terminal) to change from the broad band channel 43—44 (in which the carrier frequency of the channel used in the multi-channel system is altered away from the value normal to a channel sending terminal) into the broad band channel 39—41 (in which the carrier frequency is altered away from its normal value at the receive terminal).

From the foregoing description, it will be seen that the present invention facilitates the attainment of a high degree of freedom from cross-talk to and from a broad band channel in a multi-channel system having also channels of normal bandwidth. The invention permits of considerable reduction of filters and other equipment as required hitherto and it further improves and facilitates the maintaining of constancy and stability of the transmission characteristics of such a system.

I claim:

For transmitting a broad band of frequencies from a transmitting point to a receiving point, the combination of: a channel using normal channel-modulators and channel-filters in a single sideband multichannel carrier telephone system; carrier supply means located at one terminal of said channel, said carrier supply means supplying the carrier frequency normal in said system for said channel; additional carrier supply means located at the other terminal of said channel, said additional carrier supply means supplying a frequency different from said normal carrier frequency, the difference between said normal frequency and said different frequency being less than half the carrier spacing normal in said system; a low pass filter located at said other terminal; said low pass filter passing said broad band; filter means located at said one terminal, said filter means suppressing any vestige of unwanted sideband; frequency-shifting means located at said one terminal, said frequency shifting means annulling at the receiving point the shift in frequency range imposed upon said broad band by said different carrier supply frequency; switching means adapted to change the direction of transmission in said frequency-shifting means and to associate said filter means and said frequency-shifting means both with the desired direction of transmission in said channel; and further switching means adapted to associate said low pass filter with said desired direction of transmission.

JAMES CHARLES STEWART.

REFERENCES CITED

The following references are of record in the file of this patent:

UNITED STATES PATENTS

| Number | Name | Date |
|---|---|---|
| 1,841,142 | Mathes | Jan. 12, 1932 |
| 1,907,109 | Hinton | May 2, 1933 |
| 2,000,130 | Espenchied | May 7, 1935 |
| 2,009,438 | Dudley | July 30, 1935 |
| 2,064,907 | Green | Dec. 22, 1936 |
| 2,179,106 | Taylor | Nov. 7, 1939 |
| 2,212,240 | Talande | Aug. 20, 1940 |
| 2,270,385 | Skillman | Jan. 20, 1942 |
| 2,297,451 | Bendel | Sept. 29, 1942 |
| 2,379,052 | Weaver | June 26, 1945 |